United States Patent
Suh et al.

(10) Patent No.: US 8,803,945 B2
(45) Date of Patent: Aug. 12, 2014

(54) BROADCAST RECEIVER AND 3D VIDEO DATA PROCESSING METHOD

(75) Inventors: Jong Yeul Suh, Seoul (KR); Jeong Hyu Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 160 days.

(21) Appl. No.: 13/144,168

(22) PCT Filed: Dec. 1, 2009

(86) PCT No.: PCT/KR2009/007112
§ 371 (c)(1),
(2), (4) Date: Jul. 12, 2011

(87) PCT Pub. No.: WO2010/087575
PCT Pub. Date: Aug. 5, 2010

(65) Prior Publication Data
US 2011/0273530 A1     Nov. 10, 2011

Related U.S. Application Data

(60) Provisional application No. 61/148,997, filed on Feb. 1, 2009.

(51) Int. Cl.
H04N 13/00   (2006.01)
H04N 13/04   (2006.01)
H04N 7/32    (2006.01)

(52) U.S. Cl.
CPC ....... *H04N 13/0048* (2013.01); *H04N 13/0497* (2013.01); *H04N 13/0066* (2013.01); *H04N 19/00769* (2013.01)
USPC .......................................................... 348/42

(58) Field of Classification Search
None
See application file for complete search history.

(56) References Cited

U.S. PATENT DOCUMENTS

| | | |
|---|---|---|
| 2001/0033327 A1 | 10/2001 | Uomori et al. |
| 2006/0203085 A1 | 9/2006 | Tomita |
| 2007/0047040 A1 | 3/2007 | Ha |
| 2009/0096863 A1* | 4/2009 | Kim et al. .................. 348/42 |
| 2010/0277568 A1* | 11/2010 | Yun et al. .................. 348/43 |

FOREIGN PATENT DOCUMENTS

| | | |
|---|---|---|
| CN | 1954606 A | 4/2007 |
| CN | 101082935 A | 12/2007 |

* cited by examiner

*Primary Examiner* — Dave Czekaj
*Assistant Examiner* — Mohammad J Rahman
(74) *Attorney, Agent, or Firm* — McKenna Long & Aldridge, LLP

(57) ABSTRACT

A broadcast receiver and a 3D video data processing method are disclosed. A three dimensional (3D) video data processing method for use in a broadcast receiver includes receiving a broadcast signal including three dimensional (3D) video data, extracting display condition information of the 3D video data from the broadcast signal, and controlling an output of the 3D video data using the extracted display condition information.

18 Claims, 13 Drawing Sheets

Fig. 1

| Syntax | No. of Bits | Format |
|---|---|---|
| user_data_registered_itu_t_t35 ( ) { | | |
|     itu_t_t35_country_code | 8 | bslbf |
|     itu_t_t35_provider_code | 16 | bslbf |
|     user_identifier | 32 | bslbf |
|     user_structure ( ) | | |
| } | | | itu_t_t35_country_code = 0xB5
itu_t_t35_provider_code = 0x0031
user_identifier = 0x4741 3934

| Syntax | No. of Bits | Format |
|---|---|---|
| tATSC_user_daa ( ) { | | |
|     user_data_type_code | 8 | uimsbf |
|     user_data_type_structure ( ) | | |
| } | | | user_data_type_code = 0x11 viewing_geometry_parameter ( )

| Syntax | No. of Bits | Format |
|---|---|---|
| viewing_geometry_parameter ( ) { | | |
| pixel_interval | 16 | bslbf |
| viewing_distance | 16 | bslbf |
| } | | |

2020

| Syntax | No. of Bits | Format |
|---|---|---|
| viewing_geometry_parameter ( ) { | | |
| screen_size | 16 | bslbf |
| viewing_distance | 16 | bslbf |
| } | | |

2030

| Syntax | No. of Bits | Format |
|---|---|---|
| viewing_geometry_parameter ( ) { | | |
| pixel_interval_mapping_table_id | 8 | bslbf |
| viewing_distance_mapping_table_id | 8 | bslbf |
| pixel_interval_index | 16 | bslbf |
| viewing_distance_index | 16 | bslbf |
| } | | |

2040

| Syntax | No. of Bits | Format |
|---|---|---|
| viewing_geometry_parameter ( ) { | | |
| screen_size_mapping_table_id | 8 | bslbf |
| viewing_distance_mapping_table_id | 8 | bslbf |
| screen_size_index | 16 | bslbf |
| viewing_distance_index | 16 | bslbf |
| } | | |

Fig. 3

| Syntax | No. of Bits | Format |
|---|---|---|
| viewing_geometry_parameter_descriptor ( ) { | | |
| descriptor_tag | 8 | 0xTBD |
| descriptor_length | 8 | uimsbf |
| reserved | 6 | '111111' |
| pixel_interval_mapping_table_id | 8 | uimsbf |
| viewing_distance_mapping_table_id | 8 | uimsbf |
| screen_size_mapping_table_id | 8 | uimsbf |
| table_mapping_flag | 8 | uimsbf |
| screen_size_flag | 8 | uimsbf |
| parameter1 | 8 | uimsbf |
| parameter2 | 8 | uimsbf |
| } | | |

| table_mapping_flag | screen_size_flag | parameter1 | parameter2 |
|---|---|---|---|
| 0 | 0 | pixel_interval | viewing_distance |
| 0 | 1 | screen_size | viewing_distance |
| 1 | 0 | pixel_interval_index | viewing_distance_index |
| 1 | 1 | screen_size_index | viewing_distance_index |

Fig. 4

| Syntax | Bits | Format |
|---|---|---|
| viewing_geometry_conversion_table_section ( ) { | | |
|     table_ID | 8 | uimsbf |
|     reserved | 1 | bslbf |
|     table_data_type | 2 | bslbf |
|     version_number | 5 | bslbf |
|     reserved | 4 | bslbf |
|     section_length | 12 | uimsbf |
|     number_of_items | 8 | uimsbf |
|     for (i=0; i<number_of_items; i++) { | | |
|         index_value | 16 | uimsbf |
|         converted_value | 16 | uimsbf |
|     } | | |
| } | | |

Fig. 5

| Syntax | No. of Bits | Format |
|---|---|---|
| terrestrial_virtual_channel_table_section() { | | |
|   table_id | 8 | 0xC8 |
|   section_syntax_indicator | 8 | '1' |
|   private_indicator | | '1' |
|   reserved | | '11' |
|   section_length | | uimsbf |
|   transport_stream_id | 16 | uimsbf |
|   reserved | | '11' |
|   version_number | 16 | uimsbf |
|   current_next_indicator | | bslbf |
|   section_number | 8 | uimsbf |
|   last_section_number | | uimsbf |
|   protocol_version | | uimsbf |
|   num_channels_in_section | 8 | uimsbf |
|   for (i=0; i<num_channels_in_section; i++) { | | |
|     short_name | 8 | uimsbf |
|     reserved | 7 | '1111' |
|     major_channel_number | 1 | uimsbf |
|     minor_channel_number | | uimsbf |
|     modulation_mode | 16 | uimsbf |
|     carrier_frequency | | uimsbf |
|     channel_TSID | | uimsbf |
|     program_number | | uimsbf |
|     ETM_location | | uimsbf |
|     access_controlled | 16 | bslbf |
|     hidden | | bslbf |
|     reserved | | '11' |
|     hide_guide | | bslbf |
|     reserved | 16 | '111' |
|     service_type | | uimsbf |
|     source_id | 8 | uimsbf |
|     reserved | | '111111' |
|     descriptors_length | | uimsbf |
|     for (i=0; i<N; i++) { | | |
|       descriptor() | 16 | |
|     } | | |
|   } | | |
|   reserved | | '111111' |
|   additional_descriptors_length | 16 | uimsbf |
|   for (j=0; j<N; j++) { | | |
|     additional_descriptor() | 8 | |
|   } | | |
|   CRC_32 | | rpchof |
| } | | |

Viewing Geometry Parameter
Descriptor Position

Fig. 6

| Syntax | No. of Bits | Format |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i<N; i++) { | | |
|         descriptor() | | |
|     } | | |
|     for (i=0; i<N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i<N2; i++) { | | |
|             descriptor() | | |
|         } | | |
|     } | | |
|     CRC_32 | 32 | rpchof |
| } | | |

Viewing Geometry Parameter Descriptor Position

Fig. 11
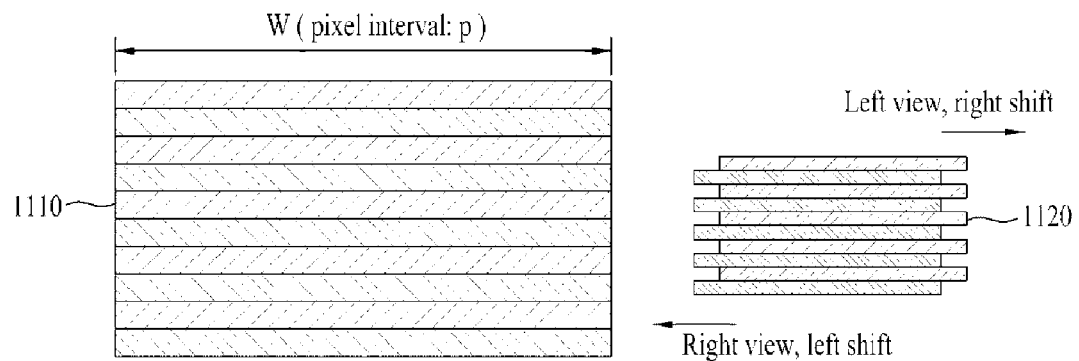
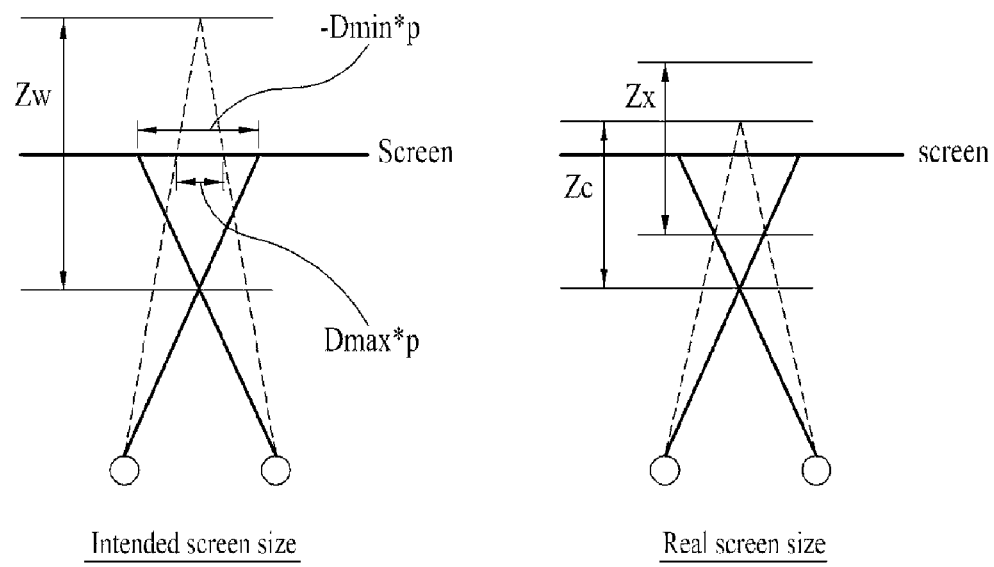
Intended screen size      Real screen size

Intended viewing distance
Real viewing distance

BROADCAST RECEIVER AND 3D VIDEO DATA PROCESSING METHOD

This application is a National Stage Entry of International Application No. PCT/KR2009/007112, filed on Dec. 1, 2009, and claims the benefit of U.S. Application No. 61/148,997 filed on Feb. 1, 2009, both of which are hereby incorporated by reference for all purposes as if fully set forth herein in their entireties.

TECHNICAL FIELD

The present invention relates to a broadcast receiver and a method for processing three dimensional (3D) video data, and more particularly to a broadcast receiver for processing received 3D video data according to a display condition of a 3D video display device, and a 3D video data processing method thereof.

BACKGROUND ART

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

DISCLOSURE OF INVENTION

Technical Problem

Accordingly, the present invention is directed to a broadcast receiver and a 3D video data processing method that substantially obviate one or more problems due to limitations and disadvantages of the related art.

An object of the present invention is to provide a broadcast receiver for processing and displaying 3D video data that has been received to have an effect intended by a manufacturer of a 3D image, resulting in the implementation of a broadcast environment that allows a user to more efficiently and conveniently utilize the 3D video data or 3D image.

Solution to Problem

The object of the present invention can be achieved by providing a three dimensional (3D) video data processing method for use in a broadcast receiver including receiving a broadcast signal including three dimensional (3D) video data, extracting display condition information of the 3D video data from the broadcast signal, and controlling an output of the 3D video data using the extracted display condition information.

In another aspect of the present invention, provided herein is a broadcast receiver including a receiver for receiving a broadcast signal including three dimensional (3D) video data, a display condition information extractor for extracting display condition information of the 3D video data from the broadcast signal, and a three dimensional (3D) video processor for controlling an output of the 3D video data using the extracted display condition information.

Advantageous Effects of Invention

According to embodiments of the present invention, the broadcast receiver can control a display device to output a 3D effect intended by a manufacturer of 3D video data on the basis of information of a viewing condition of the received 3D video data.

In addition, according to embodiments of the present invention, the broadcast receiver controls an output of a display on the basis of information of a viewing condition of 3D video data, such that it can allow display devices having different conditions to display 3D video data in response to a condition intended by a 3D-image manufacturer.

In addition, according to embodiments of the present invention, the broadcast receiver controls an output of a display on the basis of information of a viewing condition of 3D video data, such that it can provide a user with effective and convenient broadcast environments.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 1 shows a syntax structure for use in a case wherein viewing geometry parameter information is contained in a Supplemental Enhancement Information (SEI) message and the resultant SEI message is then transmitted according to one embodiment of the present invention.

FIG. 2 shows syntax structures for implementing viewing geometry parameter information according to various embodiments of the present invention.

FIG. 3 shows a syntax structure of a viewing geometry parameter descriptor that is transmitted via a Program Map Table (PMT) or a Terrestrial Virtual Channel Table (TVCT) according to one embodiment of the present invention.

FIG. 4 shows a syntax structure of a table section of viewing geometry parameter information according to one embodiment of the present invention.

FIG. 5 shows a syntax structure of a TVCT including a viewing geometry parameter descriptor according to one embodiment of the present invention.

FIG. 6 shows a syntax structure of a PMT including a viewing geometry parameter descriptor according to one embodiment of the present invention.

FIG. 11 is a conceptual diagram illustrating a 3D video data processing method for use in a broadcast receiver using viewing geometry parameter information according to one embodiment of the present invention.

BEST MODE FOR CARRYING OUT THE INVENTION

Figure 7:
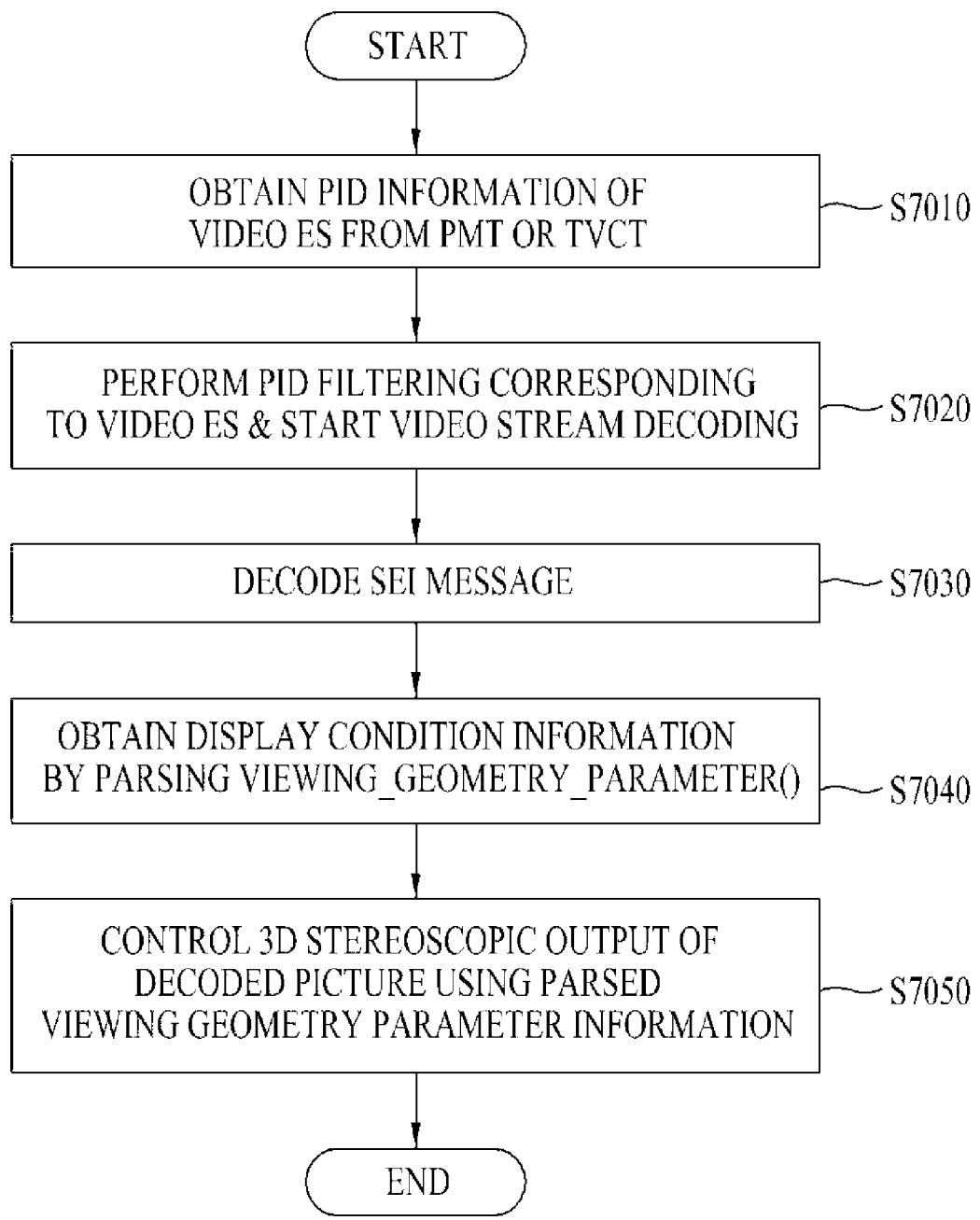
FIG. 7 is a flowchart illustrating a 3D video data processing method for use in a broadcast receiver which receives a video elementary stream (ES) wherein viewing geometry parameter information includes an SEI message according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

The 3D image display method includes a stereoscopic imaging scheme in which two view points are considered and a multi-view imaging scheme in which three or more view points are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264/Advanced Video Coding (AVC) scheme, and transmitted. In this case, the reception system may decode a received image in reverse order of the H.264/AVC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

When broadcasting the 3D image service as described above, a transmission system needs to transmit a sufficient amount of information capable of effectively rendering 3D video data received in a variety of 3D display devices. For example, in the case of displaying 3D content data manufactured for a theater on a household display device, all the intended 3D effects may not be displayed on the household display device. On the other hand, even in the case of displaying 3D content data manufactured for a household display device on a large-sized projection screen or a theater, an unexpected 3D effect different from an intended 3D effect may be displayed on the projection screen or the theater.

In other words, in the case of receiving 3D content data and displaying the same under a display condition different from an objective 3D content display condition intended by a 3D-image manufacturer, an unexpected 3D effect different from the manufacturer's intended 3D effect may be displayed or may not be matched with a user's convergence, resulting in the occurrence of eye fatigue. Accordingly, in the case of transmitting information of a display condition intended by the manufacturer of each content data, a receiver is able to adaptively perform a signaling process.

Hereinafter, a method for transmitting the display condition information and a method for allowing a receiver to receive the display condition information so as to control a 3D image display will be described in detail.

In the case of transmitting and receiving a 3D video signal (or a 3D image signal) under an Advanced Television Systems Committee (ATSC) environment according to one embodiment of the present invention, metadata capable of providing information of a display condition having been intended by a content manufacturer is needed. For convenience of description and better understanding of the present invention, the metadata may also be referred to as viewing geometry parameter information as necessary. For the metadata, viewing geometry parameter information may be transmitted via a supplemental enhancement information (SEI) message contained in a video elementary stream (ES), or a viewing geometry parameter descriptor may be added to constituent elements of Program and System Information Protocol (PSIP) information, and be then transmitted, such that a receiver is able to perform a 3D rendering process. In addition, according to one embodiment of the present invention, viewing geometry parameter information may be configured as an additional Packetized Elementary Stream (PES) packet or an elementary stream (ES), and then be transmitted to a destination.

First, a method for including viewing geometry parameter information in an video elementary stream (ES) and transmitting the resultant video ES including the viewing geometry parameter information according to one embodiment of the present invention will hereinafter be described in detail.

In case of using H.264 (or AVC) video data or MVC extension video data, a video ES may include a Supplemental Enhancement Information (SEI) message. The SEI message indicates additional information unnecessary for a decoding process of a Video Coding Layer (VCL). In addition, the SEI message may include each picture's timing information related to a Hypothetical Reference Decoder (HRD), information of a pan/scan function (i.e., a function for reading and displaying some parts of the decoded image), information necessary for random access, information independently defined by a user, and the like.

FIG. 1 shows a syntax structure for use in a case wherein viewing geometry parameter information is contained in a Supplemental Enhancement Information (SEI) message and the resultant SEI message is then transmitted according to one embodiment of the present invention.

In case of H.264 (or AVC) video data and MVC extension video data in the embodiment shown in FIG. 1, additional information may be transmitted to the SEI region, and other additional information needed for broadcast application is transmitted via a 'user_identifier' field and a 'user_structure( )' field using a 'user_data_registered_itu_t_t35( )' field having an SEI payload type value of 4.

An 'ATSC_user_data' field is located in the 'user_structure( )' field, and a broadcast receiver is able to recognize that corresponding data indicates a 'viewing_geometry_parameter( )' field using a 'user_data_type_code' field. The broadcast receiver acquires viewing geometry parameter information from the 'viewing_geometry_parameter( )' field contained in the 'user_data_type_structure' field, such that it can perform a signaling process of 3D video data using the acquired information.

FIG. 2 shows syntax structures for implementing viewing geometry parameter information according to various embodiments of the present invention.

Referring to FIG. 2, viewing geometry parameter information may include a variety of information to express a 3D effect intended by a manufacturer of a 3D image.

In one embodiment of the present invention, viewing geometry parameter information may include information of a pixel interval, information of a viewing distance, information of a screen size, and the like. The pixel interval is a parameter indicating an interval between a left image and a right image, and indicates not an interval between objects but an infinity-based interval. The viewing distance is a parameter for indicating a distance between a user and a display screen. The screen size is a parameter for indicating the size of a display screen.

As can be seen from the embodiment of FIG. 2 showing respective syntax structures of the 'viewing_geometry_parameter( )' field, the syntax structure 2010 includes a 'pixel_interval' field and a 'viewing_distance' field, the syntax structure 2020 includes a 'screen_size' field and a 'viewing_distance' field, the syntax structure 2030 includes a table index field related to the pixel_interval and a table index field related to the viewing_distance, and the syntax structure 2040 includes a table index field related to a screen_size and a table index field related to the viewing_distance. Detailed descriptions of the above-mentioned fields are as follows.

In FIG. 2, the 'pixel_interval' field indicates a actual interval between pixels on the screen size intended by a user who has acquired and/or mastered content data. In this case, the 'pixel_interval' field may be denoted by a value in millimeters (mm). The 'viewing_distance' field may indicate an optimum viewing distance intended by the user who has acquired and/ or mastered content data. In this case, the 'viewing_distance' field may be denoted by a value in centimeters (cm). The 'screen_size' field indicates a actual value of the screen size intended by a user who has acquired and/or mastered content data. In this case, the 'screen_size' field may be denoted by a value in inches. The 'pixel_interval_index' field indicates an index of a corresponding pixel interval in a table including available pixel interval values. The 'viewing_distance_index' field indicates an index of a corresponding viewing distance in a table including available viewing distance values. The 'screen_size_index' field indicates an index of a corresponding screen size in a table including available screen size values.

A unit established for actual values among a variety of information represented by fields shown in FIG. 2 may be changed to another unit according to display conditions (for example, a device type, a transmission system, and the like). The number of bits allocated to each field may be changed to another number according to the range of available values. Table information of each table may be predetermined for syntaxes referring to respective tables so that a decoder may pre-recognize such table information, or the respective tables may be transmitted together with the above-mentioned information shown in FIG. 2.

In case of transmitting tables, a variety of data conversions for the same data can be made available. Each table may include a table identification (ID). In case of using an index value, this index value can determine which one of tables having been received or stored using a table ID to be used will be used.

In FIG. 2, the 'pixel_interval_mapping_table_id' field, the 'viewing_distance_mapping_table_id' field, and the 'screen_size_mapping_table_id' field may indicate which table will be used in an index conversion process under the condition that a plurality of tables for respective data units are received or stored. In case of receiving table data, each table may have a unique ID. Therefore, the broadcast receiver uses not only index data but also a table corresponding to a table ID mapped to this index data, so that it can acquire viewing geometry parameter information matched to an index value.

A method for including viewing geometry parameter information in a TVCT or PMT of Program Specific Information (PSI)/Program and System Information Protocol (PSIP) information and then transmitting the resultant PSI/PSIP information including the viewing geometry parameter information according to one embodiment of the present invention will herein after be described in detail.

In accordance with embodiments of the present invention, the viewing geometry parameter information may be newly added to a PSI/PSIP as necessary. However, the scope and spirit of the present invention are not limited to the above-mentioned examples. If it is assumed that there is a protocol capable of transmitting the system information in table format, the scope and spirit of the present invention can also be applied to other examples irrespective of titles of the system information.

The PSI is disclosed only for illustrative purposes and better understanding of the present invention. The PSI may include a Program Association Table (PAT), a Conditional Access Table (CAT), a Program Map Table (PMT), a Network Information Table (NIT), etc.

The PAT corresponds to specific information which is transmitted by a packet having a PID of '0'. The PAT transmits PID information of the PMT and PID information of the NIT of each program. The CAT transmits information of a pay broadcast service used in the broadcast transmission system. The PMT transmits a program identification number, packet identifier (PID) information of a transport stream packet, in which individual bit streams of video and audio data constituting a program are transmitted, and PID information, in which a PCT is transmitted. The NIT transmits information of an actual transmission network. For example, PID information of a program number and the PMT may be acquired by parsing the PAT having a PID of '0'. In addition, in the case where the PMT acquired from the PAT is parsed, information regarding correlation among constituent elements of a program is acquired.

The PSIP may include, for example, a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), a Master Guide Table (MGT), and the like.

The VCT transmits information about a virtual channel, for example, channel information for selecting a channel and information about a packet identifier (PID) for receiving audio and/or video data. That is, when the VCT is parsed, a channel name, a channel number, and the PID of the audio and video data of a broadcast program carried in the channel can be known. The STT transmits current date and time information, and the RRT transmits information about a region and a deliberative council for a program rating level. The ETT transmits an additional description about a channel and a broadcast program, and the EIT transmits information about an event of a virtual channel. The DCCT/DCCSCT transmits information about an automatic channel change, and the MGT transmits version- and PID-information of individual tables contained in the PSIP. In one embodiment of the present invention, the VCT may also be a Terrestrial Virtual Channel Table (TVCT) as necessary.

FIG. 3 shows a syntax structure of a viewing geometry parameter descriptor that is transmitted via a PMT or a TVCT according to one embodiment of the present invention.

Referring to FIG. 3, a descriptor is used as viewing geometry parameter information, and includes a screen size (or an inter-pixel interval equivalent to the screen size) intended by a manufacturer of 3D content data and an optimum viewing distance. The descriptor may be included in a first descriptor loop of a TVCT or a first descriptor loop of a PMT, such that the resultant first descriptor loop including the descriptor may be transferred. In addition, according to another embodiment of the present invention, a viewing geometry parameter descriptor may be included in a second descriptor loop of a TVCT or PMT, or other loops, and the resultant loop(s) including the viewing geometry parameter descriptor may be transmitted.

Individual fields and parameters contained in the descriptor shown in FIG. 3 will hereinafter be described in detail.

A 'descriptor_tag' field is used as an ID of the descriptor, and can assign an empty value to an 'ATSC A/65' field. The 'descriptor_tag' field may indicate that this descriptor is used as a viewing geometry parameter descriptor.

A 'descriptor_length' field may include information about the number of bytes contained in the descriptor.

A 'pixel_interval_mapping_table_id' field may indicate a table that has been mapped to pixel interval values and has been transmitted.

A 'viewing_distance_mapping_table_id' field may identify a table that is transmitted after being mapped to viewing distance values.

A 'screen_size_mapping_table_id' field may identify a table that is transmitted after being mapped to screen size values.

If a 'table_mapping_flag' field is set to a value of '1', this means that parameter values are set to mapping values of a table index. Otherwise, if the 'table_mapping_flag' field is set to a value of '0', this means that parameter values are set to actual values.

If a 'screen_size_flag' field is set to a value of '1', this means that a value of the screen size is transmitted. Otherwise, if the 'screen_size_flag' field is set to a value of '0', this means that the pixel interval value is transmitted.

The 'pixel_interval' field may indicate a actual interval between pixels on a screen size intended by a user who has acquired and/or mastered content data. In this case, the 'pixel_interval' field may be denoted by a value in millimeters (mm).

The 'viewing_distance' field may indicate an optimum viewing distance intended by the user who has acquired and/or mastered content data. In this case, the 'viewing_distance' field may be denoted by a value in centimeters (cm).

The 'screen_size' field may indicate a actual value of the screen size intended by a user who has acquired and/or mastered content data. In this case, the 'screen_size' field may be denoted by a value in inches.

The 'pixel_interval_index' field may indicate a corresponding value in a table including available pixel interval values.

The 'viewing_distance_index' field may indicate a corresponding value in a table including available viewing distance values.

The 'screen_size_index' field may indicate a corresponding value in a table including available screen size values.

A unit established for actual values in the syntax of FIG. 3 may be changed to another unit, and the number of bits allocated to each field may be changed to another number according to the range of available values. Table information of each table may be pre-established for syntaxes referring to respective tables so that a decoder may pre-recognize such table information, or a transmission system may transmit respective tables to a decoder.

FIG. 4 shows a syntax structure of a table section of viewing geometry parameter information according to one embodiment of the present invention.

In case of receiving a 'pixel_interval_index' field, a 'viewing_distance_index' field, and a 'screen_size_index' field as shown in FIG. 3, there is a need to refer to tables so as to convert the above-mentioned fields into real-sized fields. Corresponding data may be received in the form of an additional table section, and may be transmitted in the form of a syntax shown in FIG. 4.

In FIG. 4, a 'table_data_type' field may indicate which one of a pixel interval, a viewing distance, and a screen size corresponds to data contained in the table.

A 'converted_value' field may indicate a actual pixel interval, a actual viewing distance, and a actual screen size, that are mapped to index values denoted by the 'index_value' field according to the 'table_data_type' field.

It is possible for several tables for the same data type to be received using the same table ID, and these table reception operations can be distinguished by the 'version_number' field. If only the 'version_number' field is different from other fields in FIG. 4, data filling an index omitted from a corresponding conversion table may be received, or updated or revised data for a conventional index may be received. That is, conversion system categories and data types can be recognized using the 'table_id' field and the 'table_data_type' field. A receiver may update data of the same 'table_id' and 'table_data_type' fields using the 'version_number' field.

FIG. 5 shows a syntax structure of a TVCT including a viewing geometry parameter descriptor according to one embodiment of the present invention.

Referring to FIG. 5, the viewing geometry parameter descriptor may be contained in a first descriptor loop of a TVCT, and may then be transmitted. Optionally, the viewing geometry parameter descriptor may be contained in another loop different from the first descriptor loop of the TVCT, and may then be transmitted.

Detailed descriptions of individual fields contained in the TVCT shown in FIG. 5 are as follows.

A 'table_id' field is an 8-bit unsigned integer field that indicates the type of table section.

A 'section_syntax_indicator' field is a one-bit field which shall be set to '1' for the 'terrestrial_virtual_channel_table_section( )' field.

A 'private_indicator' field is a one-bit field which shall be set to '1'.

A 'section_length' field is a 12-bit field in which the first two bits shall be set to '00', and specifies the number of bytes of the section, starting immediately following the 'section_length' field, and including the CRC.

A 'transport_stream_id' field indicates the 16-bit MPEG-2 Transport Stream (TS) ID. The 'transport_stream_id' field distinguishes a Terrestrial Virtual Channel Table (TVCT) from others that may be broadcast in different PTCs.

A 'version_number' field serving as a 5-bit field indicates a version number of the Virtual Channel Table (VCT).

A 'current_next_indicator' field is a one-bit indicator. In the case where the 'current_next_indicator' field is set to '1', this means that a transmitted Virtual Channel Table (VCT) is currently applicable. When a bit of the 'current_next_indicator' field is set to '0', this means that the transmitted table is not yet applicable and shall be the next table to become valid.

A 'section_number' field is an 8-bit field which gives the number of this section.

A 'last_section_number' field serving as an 8-bit field specifies the number of the last section (that is, the section with the highest section_number value) of the complete Terrestrial Virtual Channel Table (TVCT).

A 'protocol_version' field serving as an 8-bit unsigned integer field is used to allow, in the future, the table type to carry parameters that may be structured differently than those defined in the current protocol.

A 'num_channels_in_section' field serving as an 8-bit field specifies the number of virtual channels in this VCT section.

A 'short_name' field may indicate the name of the virtual channel, represented as a sequence of one to seven 16-bit code values interpreted in accordance with the UTF-16 representation of unicode character data.

A 'major_channel_number' field indicates a 10-bit number that represents the 'major' channel number associated with the virtual channel being defined in this iteration of the 'for' loop.

A 'minor_channel_number' field indicates a 10-bit number in the range from '0' to '999' so as to represent the 'minor' or 'sub' channel number. This 'minor_channel_number' field together with the 'major_channel_number' field may indicate a two-part channel number, where the 'minor_channel_number' field represents the second or right-hand part of the number.

A 'modulation_mode' field including an 8-bit unsigned integer may indicate a modulation mode for the transmitted carrier associated with the virtual channel.

A 'carrier_frequency' field may indicate an allowed carrier frequency.

A 'channel_TSID' field is a 16-bit unsigned integer field in the range from 0x0000 to 0xFFFF. The 'channel_TSID' field represents an MPEG-2 Transport Stream (TS) ID associated with the Transport Stream (TS) carrying the MPEG-2 program referenced by the virtual channel.

A 'program_number' field includes a 16-bit unsigned integer that associates the virtual channel being defined here with the MPEG-2 program association and TS program map tables.

An 'ETM_location' field serving as a 2-bit field specifies the existence and the location of an Extended Text Message (ETM).

An 'access_controlled' field indicates a 1-bit Boolean flag. When the Boolean flag of the 'access_controlled' field is set, this means that accessing the events associated with a virtual channel may be controlled.

A 'hidden' field indicates a 1-bit Boolean flag. When the Boolean flag of the 'hidden' field is set, this means that the virtual channel is not accessed by a user by a direct entry of the virtual channel number.

A 'hide_guide' field indicates a Boolean flag. When the Boolean flag of the hide_guide' field is set to zero '0' for a hidden channel, this means that the virtual channel and virtual channel events may appear in EPG displays.

A 'service_type' field is a 6-bit enumerated type field that shall identify the type of service carried in the virtual channel.

A 'source_id field' includes a 16-bit unsigned integer that identifies the programming source associated with the virtual channel.

A 'descriptors_length' field may indicate a total length (in bytes) of descriptors for a virtual channel.

A 'descriptor( )' field may include zero or more descriptors determined to be appropriate for the 'descriptor( )' field.

An 'additional_descriptors_length' field may indicate a total length (in bytes) of a VCT descriptor list.

A 'CRC_32' field is a 32-bit field which contains a CRC value that ensures a zero output of registers in the decoder defined in Annex A of ISO/IEC 138181 "MPEG-2 Systems" [8] after processing the entire Terrestrial Virtual Channel Table (TVCT) section.

FIG. 6 shows a syntax structure of a PMT including a viewing geometry parameter descriptor according to one embodiment of the present invention.

Referring to FIG. 6, a viewing geometry parameter descriptor may be contained in a first descriptor loop of a PMT. Optionally, the viewing geometry parameter descriptor may be contained in another loop different from the first descriptor loop of the PMT, and may then be transmitted.

Detailed descriptions of individual fields contained in the PMT shown in FIG. 6 are as follows.

A 'table_id' field is an 8-bit field which shall always be set to '0x02' in a 'TS_program_map_section' field.

A 'section_syntax_indicator' field is a 1-bit field which shall be set to '1'.

A 'section_length' field is a 12-bit field in which first two bits shall be set to '00', and specifies the number of bytes of the section starting immediately the 'section_length' field, and including the CRC.

A 'program_number' field is a 16-bit field, which specifies the program to which the 'program_map_PID' field is applicable.

A 'version_number' field is a 5-bit field, which indicates the version number of the 'TS_program_map_section' field.

A 'current_next_indicator' field is a 1-bit field. When a bit of the 'current_next_indicator' field is set to '1', this means that the transmitted 'TS_program_map_section' field is currently applicable. When a bit of the 'current_next_indicator' field is set to '0', this means that the transmitted 'TS_program_map_section' field is not yet applicable and shall be the next 'TS_program_map_section' field to become valid.

A 'section_number' field includes a value of an 8-bit field which shall be '0x00'.

A 'last_section_number' field includes a value of an 8-bit field which shall be '0x00'.

A 'PCR_PID' field is a 13-bit field indicating the PID of the Transport Stream (TS) packets which shall contain the PCR fields valid for the program specified by a 'program_number' field. In the case where no PCR is associated with a program definition for private streams, then this field shall take the value of '0x1FFF'.

A 'program_info_length' field is a 12-bit field, the first two bits of which shall be '00'. The 'program_info_length' field specifies the number of bytes of descriptors immediately following the 'program_info_length' field.

A 'stream_type' field is an 8-bit field specifying the type of elementary stream or payload carried within packets with the PID whose value is specified by the 'elementary_PID' field.

An 'elementary_PID' field is a 13-bit field specifying a PID of the Transport Stream (TS) packets which carry the associated elementary stream or payload.

An 'ES_info_length' field is a 12-bit field, the first two bits of which shall be '00'. The 'ES_info_length' field may specify the number of bytes of descriptors of the associated elementary stream immediately following the 'ES_info_length' field.

A 'CRC_32' field is a 32-bit field which contains a CRC value that gives a zero output of registers in the decoder defined in Annex B after processing the entire Transport Stream program map section.

FIG. 7 is a flowchart illustrating a 3D video data processing method for use in a broadcast receiver which receives a video elementary stream (ES) wherein viewing geometry parameter information includes an SEI message according to one embodiment of the present invention.

Referring to FIG. 7, a broadcast receiver receives a broadcast signal, parses Program and System Information Protocol (PSIP) information, and may obtain PID information of a video ES from a Program Map Table (PMT) or Terrestrial Virtual Channel Table (TVCT) contained in the PSIP information at step S7010. The broadcast receiver may filter a corresponding video ES by establishing a filter using the obtained PID information, and then decode the extracted video stream at step S7020.

The broadcast receiver is able to decode the SEI message by decoding the video stream at step S7030.

The broadcast receiver parses viewing geometry parameter information contained in the SEI message, such that it is able to recognize display condition information of a corresponding picture at step S7040. The display condition information may be obtained by parsing fields shown in FIG. 2. For example, the display condition information may include information of a screen size, information of a pixel interval, information of a viewing distance, and the like.

The broadcast receiver controls the 3D stereoscopic output of the decoded picture using the parsed viewing geometry parameter information at step S7050.

Figure 8:
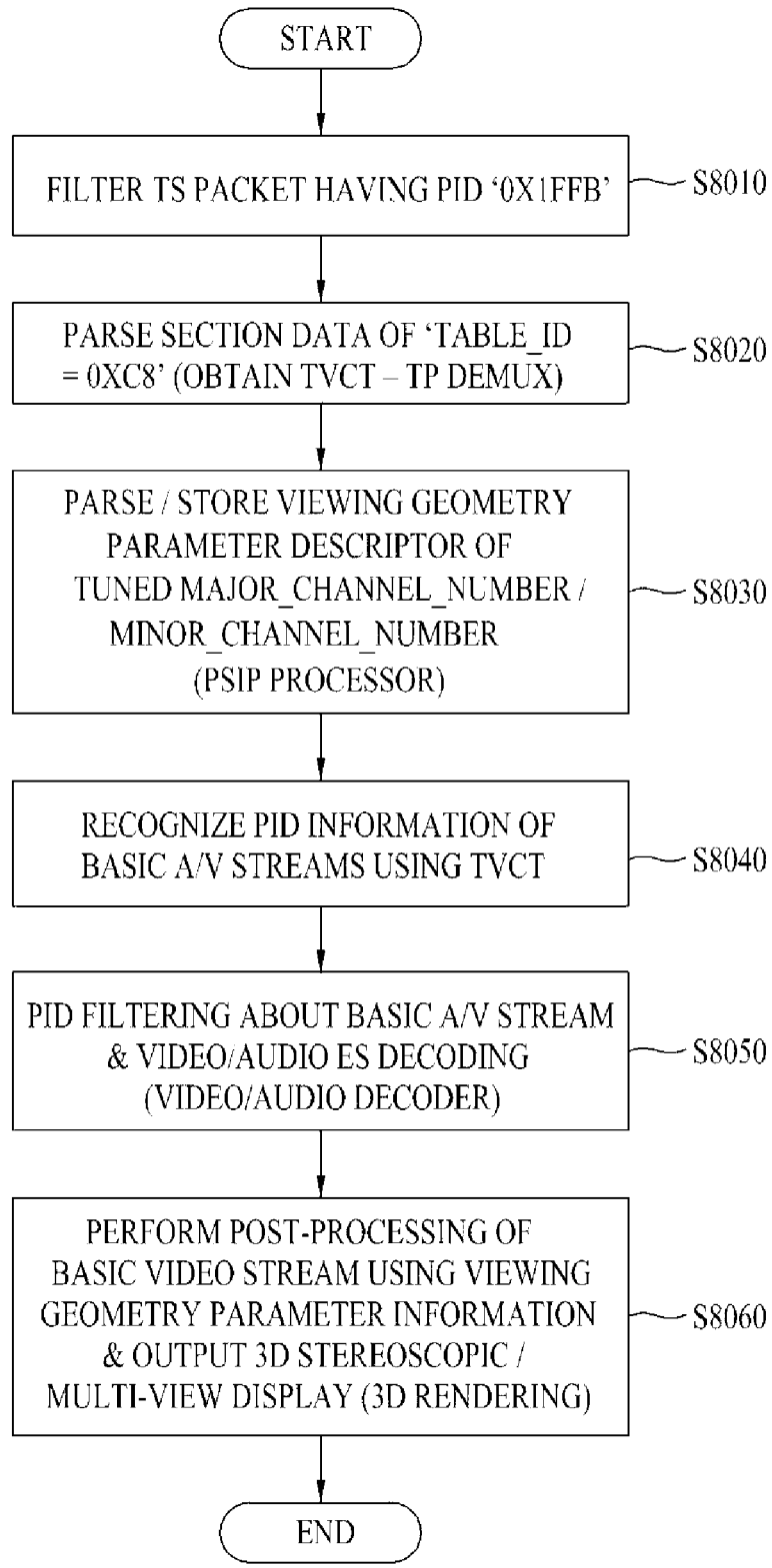
FIG. 8 is a flowchart illustrating a 3D video data processing method for use in a broadcast receiver which receives a broadcast signal wherein viewing geometry parameter information is contained in a TVCT or a PMT according to one embodiment of the present invention.

FIG. 8 is a flowchart illustrating a 3D video data processing method for use in a broadcast receiver which receives a broadcast signal wherein viewing geometry parameter information is contained in a TVCT or a PMT according to one embodiment of the present invention.

In more detail, FIG. 8 is a flowchart illustrating a method for processing 3D video data by obtaining viewing geometry parameter information through a TVCT.

Referring to FIG. 8, the broadcast receiver filters a TS packet, a PID of which is set to 0x1FFB at step S8010, and then obtains a TVCT by parsing section data, a table ID of which is set to 0xC8 at step S8020. These operations of the broadcast receiver may be carried out by a TP demultiplexer (TP Demux). The broadcast receiver may parse a PMT instead of parsing a TVCT.

The broadcast receiver parses viewing geometry parameter information of tuned major and minor channel numbers, and stores the parsed viewing geometry parameter information at step S8030. The viewing geometry parameter information may be obtained by parsing the obtained TVCT. This obtaining operation may be carried out in a PSIP processor of the broadcast receiver.

The broadcast receiver may obtain PID information of audio/video (A/V) streams using a TVCT at step S8040. The broadcast receiver performs a PID filtering process through the obtained PID information so as to extract an A/V ES, and then decodes the extracted A/V ES at step S8050.

The broadcast receiver performs post-processing of a video stream using viewing geometry parameter information, such that it can control an output of 3D image display at step S8060. The above-mentioned 3D video data processing performed by the broadcast receiver may also be referred to as 3D rendering. The broadcast receiver renders a video stream, that has been received to be appropriate for a viewing condition obtained through the viewing geometry parameter information, such that it can output the rendered video stream in a manner that a user can recognize a 3D effect intended by a 3D-image manufacturer.

Figure 9:
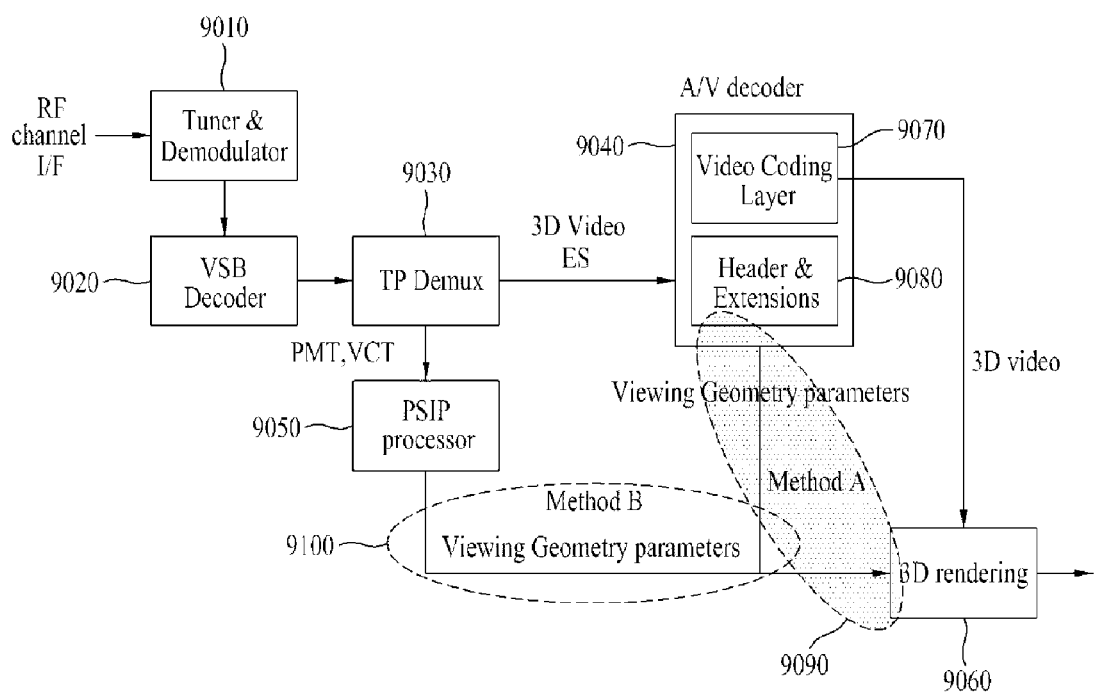
FIG. 9 is a block diagram illustrating a broadcast receiver for processing 3D video data using viewing geometry parameter information according to one embodiment of the present invention.

FIG. 9 is a block diagram illustrating a broadcast receiver for processing 3D video data using viewing geometry parameter information according to one embodiment of the present invention.

Referring to FIG. 9, a broadcast receiver includes a tuner and demodulator 9010, a Vestigial Side Band (VSB) decoder 9020, a Transport Packet (TP) demultiplexer (TP Demux) 9030, an Audio/Video (A/V) decoder 9040, a PSIP processor 9050, a 3D rendering unit 9060 (hereinafter referred to as a 3D video processor 9060). The A/V decoder 9040 may include a video coding layer 9070 for processing video data and a Header & Extensions unit 9080 for processing supplemental data. The A/V decoder 9040 may also be called a video decoder 9040 when a video ES is processed as shown in the following description.

In FIG. 9, the broadcast receiver may be operated in different ways according to methods for transmitting viewing geometry parameter information. In FIG. 9, a method 'A' 9090 indicates how the broadcast receiver is operated when viewing geometry parameter information is transmitted after being contained in a video ES. A method 'B' 9100 indicates how the broadcast receiver is operated when viewing geometry parameter information is transmitted after being contained in a PMT or a TVCT.

A broadcast receiver tunes a broadcast signal of a desired channel using the tuner and demodulator 9010 (hereinafter could be referred to as a receiving unit 9010), receives the tuned broadcast signal, and demodulates the received broadcast signal. The baseband signal or an Intermediate Frequency (IF) signal generated from the tuner and demodulator 9010 is VSB-decoded by the VSB decoder 9020, such that the VSB-decoded baseband or IF signal is output in the form of a data stream. The TP demultiplexer 9030 extracts a supplemental data stream and the like from the received data stream, wherein the supplemental data stream includes a video ES, a PMT, and a TVCT.

Firstly, the operation 9090 of the broadcast receiver when viewing geometry parameter information is contained in the SEI message of the video stream and is then transmitted will hereinafter be described in detail.

The broadcast receiver acquires PID information of a desired video ES from a PMT and TVCT parsed from the PSIP processor 9050, and allows the TP demultiplexer 9030 to extract the desired video ES using the acquired PID information. The video decoder 9040 decodes video data using the video coding layer 9070, and decodes supplemental data including the SEI message using the header and Extensions unit 9080. Therefore, the broadcast receiver allows the video decoder 9040 to decode the SEI message, such that it can acquire viewing geometry parameter information.

The broadcast receiver controls and processes video data, received from the video decoder 9040 through the 3D video processor 9060, using the acquired viewing geometry parameter information, and finally outputs the processed video data.

The operation 9100 of the broadcast receiver when viewing geometry parameter information is contained in a PMT or TVCT and then transmitted will hereinafter be described in detail.

The broadcast receiver extracts a supplemental data stream including a PMT and a TVCT through the TP demultiplexer 9030, and outputs the PMT or TVCT to the PSIP processor 9050. The PSIP processor 9050 parses the PMT or TVCT, such that it obtains not only PID information of a 3D video stream contained in a broadcast signal but also viewing geometry parameter information.

The broadcast receiver receives a desired 3D video stream through the tuner and demodulator 9010 using the acquired PID information, and extracts the desired 3D video stream through the use of the TP demultiplexer 9030. The 3D video stream is decoded by the video decoder 9040, and is then output to the 3D video processor 9060. The broadcast receiver allows the 3D video processor 9060 to control and process video data using viewing geometry parameter information, and finally outputs the processed video data.

As described above, according to the method 'A', viewing geometry parameter information may be extracted from the video decoder 9040. According to the method 'B', viewing geometry parameter information may be extracted from the PSIP processor 9050. From the viewpoint of processing the viewing geometry parameter information, the video decoder 9040 and the PSIP processor 9050 may be referred to as a display condition information extractor as necessary. In other words, the display condition information extractor may be adapted to extract the above-mentioned viewing geometry parameter information contained in the broadcast receiver. In accordance with one embodiment of the present invention, the display condition information extractor includes the video decoder 9040 and the PSIP processor 9050, such that it can process the viewing geometry parameter information according to the above methods.

In FIG. 9, although the repeated description about the same parts has been omitted for convenience of description, it should be understood that the broadcast receiver shown in FIG. 9 can carry out all the methods described in FIGS. 7 and 8.

Next, a variety of embodiments about a method for controlling a display output of 3D video data in such a manner that a 3D effect intended by a 3D-image manufacturer is obtained using the acquired viewing geometry parameter information will hereinafter be described in detail.

Figure 10:
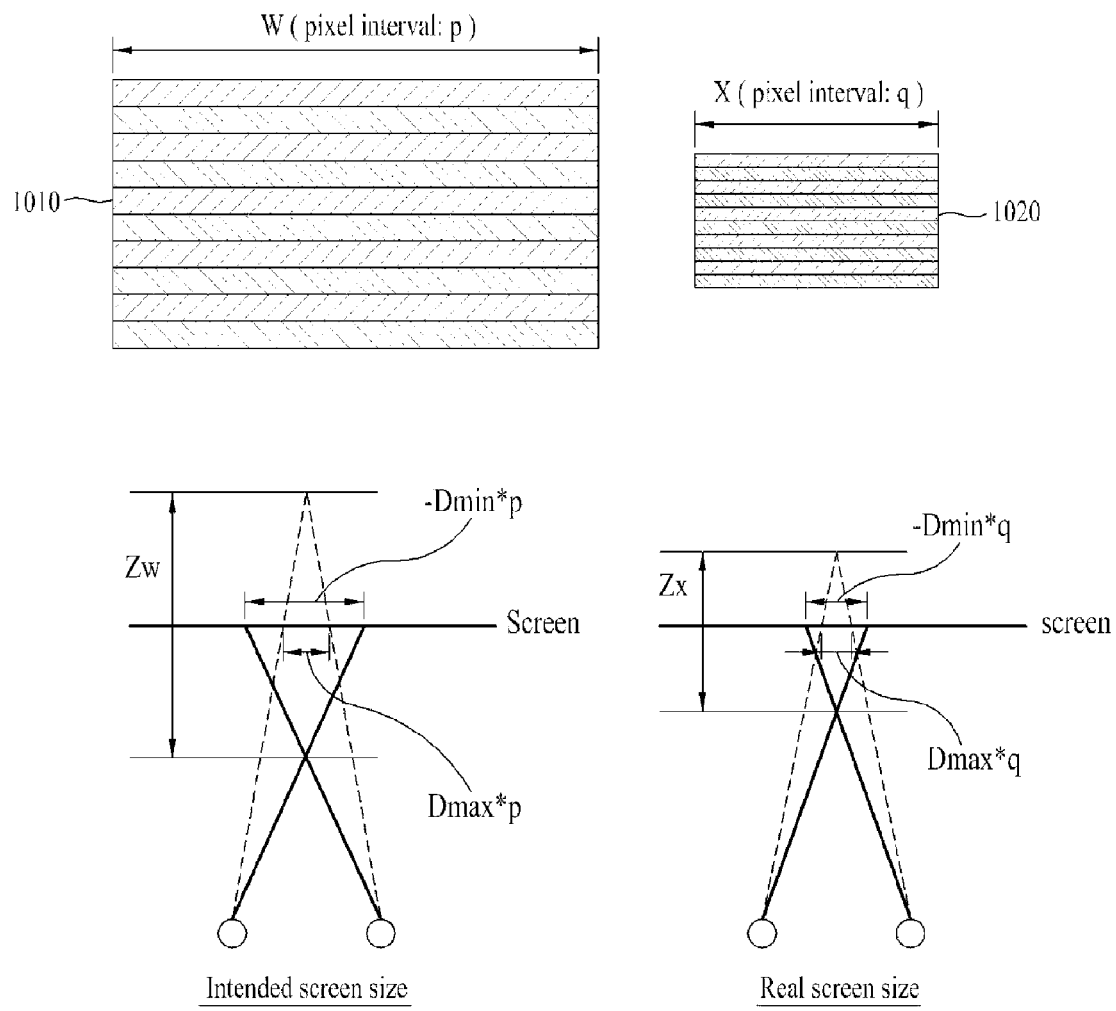
FIG. 10 shows a difference in 3D effect between an initial display condition intended by a 3D-image manufacturer and other 3D image display conditions different from the initial display condition according to one embodiment of the present invention.

FIG. 10 shows a difference in 3D effect between an initial display condition intended by a 3D-image manufacturer and other 3D image display conditions different from the initial display condition according to one embodiment of the present invention.

In FIG. 10, a left-sided part shows an intended screen 1010 and a 3D effect based on an intended screen size, and a right-sided part shows not only a screen 1020 of a display device used by a viewing user but also a 3D effect based on an intended screen size.

FIG. 10 shows a method for forming a 3D image, in more detail, FIG. 10 shows an example of a stereoscopic image implemented in a horizontally interleaved format for use in the 3D image forming method.

The 3D effect may be measured and displayed in various ways. In accordance with an embodiment of the present invention, a difference in 3D effects will be represented by a disparity, a depth range, or a depth value from the viewer's eyes to an image on which an image of an object is formed.

The 3D effect may be acquired from the process in visual perception leading to the sensation of depth from two slightly different projections of the world onto the retinas of the eyes. The difference in the two retinal images may be called horizontal disparity, retinal disparity, or binocular disparity. Hereinafter, for convenience of description and better understanding of the present invention, the difference between the two retinal images will only be referred to as 'disparity'.

The depth range may be represented by an interval between the nearest location and the farthest location on the basis of a reference location where a viewer can recognize a 3D effect under a display condition of a 3D image. For example, the above interval may be represented by Dmin and Dmax.

In FIG. 10, it is assumed that the originally intended screen size of a manufacturer of 3D image contents is denoted by W, a screen size of a display device of a receiving unit is denoted by X, and pixel intervals corresponding to individual screen sizes are denoted by p and q. In the embodiment of FIG. 10, X is denoted by 'X=W/2' and q is denoted by 'q=p/2'.

If it is assumed that a disparity value at a specific point is D, a physical size of the intended disparity of a 3D-image manufacturer is denoted by D×P, and a physical size of the disparity capable of being recognized by a viewer is denoted by 'D×q' (=D×p/2).

If it is assumed that a depth range denoted by a disparity value is represented by Dmin and Dmax, a physical depth range intended by a manufacturer is 'Dmin×p' and 'Dmax× p', and a physical depth range capable of being recognized by a viewer in a receiving unit is [Dmin×q, Dmax×q] (=[Dmin× p/2, Dmax×p/2]).

Therefore, a 3D effect capable of being recognized by the viewer on the screen 1020 of the receiving unit corresponds to about half of an original 3D effect intended by a 3D-image manufacturer.

A depth value from the viewer's eyes to a retinal image on which an object image is formed is denoted by a value of 'Zx' that is equal to about the half of an originally intended size of 'Zw'.

In other words, a receiver can acquire a difference in 3D effects through the use of screen size information or pixel interval information contained in the transmitted viewing geometry parameter information.

In this case, there are a variety of methods for acquiring the originally intended 3D effect or compensating for a difference in 3D effects, for example, a method for carrying out convergence control by horizontally shifting a left image and a right image, a method for scaling individual depth values contained in a depth map, a method for adjusting a viewing distance, and the like.

FIG. 11 is a conceptual diagram illustrating a 3D video data processing method for use in a broadcast receiver using viewing geometry parameter information according to one embodiment of the present invention.

In FIG. 11, a left-sided part shows an intended screen 1110 and a 3D effect based on an intended screen size, and a right-sided part shows not only a screen 1120 of a display device used by a viewing user but also a 3D effect based on an intended screen size.

FIG. 11 shows a method for compensating for a 3D effect that is reduced in response to a reduced display screen of the receiving unit as previously stated in FIG. 10. FIG. 11 shows a method for horizontally shifting a left image and a right image that are displayed on the screen.

In order to compensate for a reduced depth range in which a depth value of Zw is reduced to another depth value of Zx, the left image is shifted to the right, and the right image is shifted to the left, such that the reduced depth value of Zx can be compensated in the range of Zc. In the case where the display screen of the receiving unit becomes larger than the intended screen size of the manufacturer, individual images are shifted in opposite directions, such that a changed 3D effect can be compensated for. It is also possible that with considering various display conditions, one of the left image and the right image can be shifted.

The shifted distance can be calculated by the following method according to one embodiment of the present invention.

It is assumed that q is denoted by $q=p/2$ on the basis of a pixel interval in the same manner as in FIG. 10. Parameter values of individual 3D effects reduced in the receiving unit approximate the reduced screen size rates, and these rates are equal to the reduced pixel interval rates according to one embodiment of the present invention.

Therefore, each of left and right images is shifted by the reduced pixel interval, such that the 3D effect can be compensated for. In FIGS. 10 and 11, a distance Dshift between the shifted images may be equal to 'p−q'. However, the distance value Dshift-calculated in consideration of not only the screen construction of a display screen of the receiving unit but also widths of the left and right images of the transmitted image may be less than 'p−q'. In this case, as can be seen from FIG. 11, the depth value of Zx may be compensated to a value of Zc instead of the manufacturer's intended value of Zw.

Figure 12:
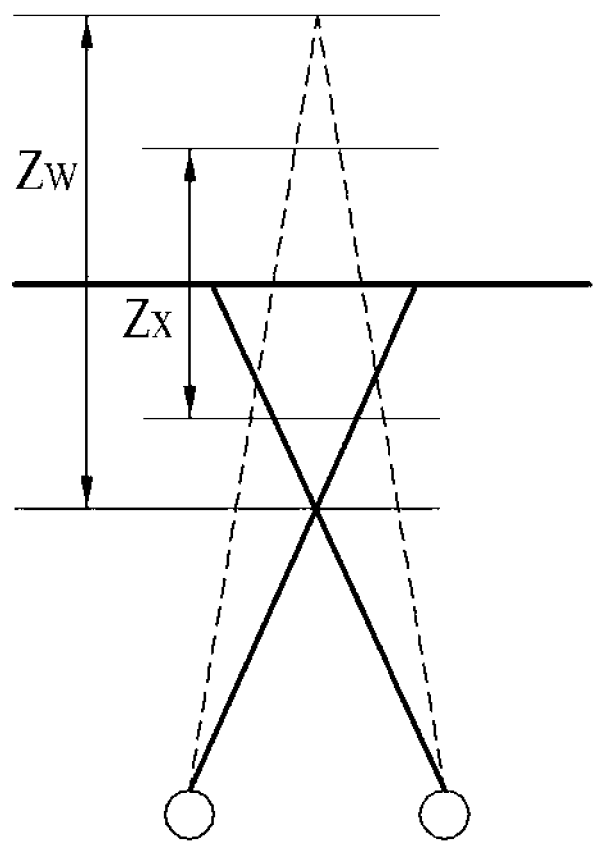
FIG. 12 is a conceptual diagram illustrating a 3D video data processing method for use in a broadcast receiver using viewing geometry parameter information according to one embodiment of the present invention.

FIG. 12 is a conceptual diagram illustrating a 3D video data processing method for use in a broadcast receiver using viewing geometry parameter information according to another embodiment of the present invention.

FIG. 12 shows a method for compensating for a 3D effect being reduced in response to a display screen of the receiving unit in the same manner as in FIG. 10. In more detail, FIG. 12 shows a method for scaling a depth map. The depth map is a kind of data table having depth values of individual pixel coordinates of a real image.

In order to adjust a 3D effect of the transmitted 3D image, a depth value of a Z axis may be contained in a depth map and then be transmitted. In this case, individual broadcast receivers may have different ranges of the Z axis capable of being displayed, and a depth value of the received Z axis is compared with a depth value of the displayable Z axis in such a way that a Z axis depth value of the 3D image is corrected, so that the corrected resultant image is displayed.

In accordance with one embodiment of the present invention, if it is assumed that the value of Zx intended by a content manufacturer is in the range of coordinates from 'Zxmin' to 'Zxmax', and the value of Zw capable of being displayed on the receiving part is in the range of coordinates from 'Zwmin' to 'Zwmax', the mapping from Zx to Zw through the scaling process can be carried out by the following equation.

$$Zw = Zx \times ((Zw\max - Zw\min)/(Zx\max - Zx\min)) + Zw\min \quad \text{[Equation]}$$

In another embodiment of the present invention, assuming that 'Zxmin<0<Zxmax' and 'Zwmin<0<Zwmax' and an object image is formed in front of a screen when values of Zx and Zw become higher, the following mapping can be performed to maintain a relative position relationship between the object image and the screen, as denoted by the following equations.

[Equations]

$$Zw = Zx \times (Zw\max/Zx\max) \text{ when } Zx > 0 \qquad 1$$

$$Zw = Zx \times (Zw\min/Zx\min) \text{ when } Zx < 0 \qquad 2$$

$$Zx = 0 \text{ when } Zw = 0 \qquad 3$$

In other words, the above-mentioned mapping can prevent an object image located inside the screen from being come out of the screen in forward and an object image located outside the screen from being come in of the screen in backward during the scaling process. In this embodiment of the present invention, the relative position of a recognized object is located in front of the screen when each of the values of Zx and Zw is higher than zero '0', and is located behind the screen when each of the values of Zx and Zw is less than zero '0'.

In accordance with the method for scaling the above-mentioned depth map, the depth map may be transmitted in various ways. The depth map may be transmitted in an elementary stream having an additional PID such as a video stream, or may be transmitted via out of band (i.e., a path such as an Internet). In addition, the depth map may be contained in a header of video data and then transmitted. In this case, in the case where the depth map is transmitted, the depth map may be present in each image or in each frame while being transmitted. Alternatively, the depth map may be contained in the above-mentioned viewing geometry parameter information, or may be transmitted together with the viewing geometry parameter information.

Figure 13:
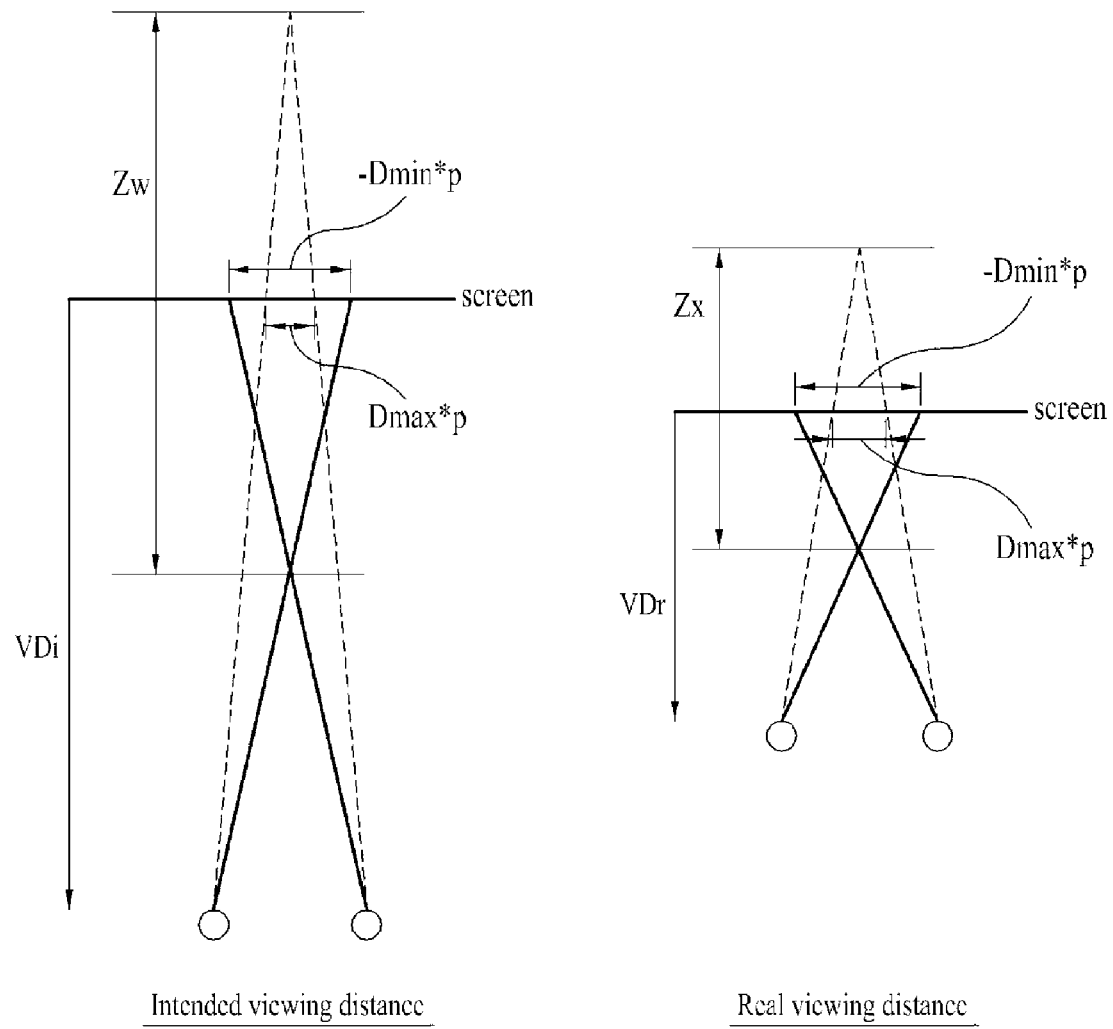
FIG. 13 shows a difference in 3D effect between viewing distances according to one embodiment of the present invention.

FIG. 13 shows a difference in 3D effect between viewing distances according to one embodiment of the present invention.

In the case where the intended screen size of a manufacturer is equal to the size of a display screen of a receiver, a variation in 3D effect in response to a variation of a viewing distance is shown in FIG. 13. In FIG. 13, the viewing distance intended by the manufacturer is denoted by VDi, and a viewing distance of the receiving unit is denoted by VDr.

For example, when VDr=VDi/2, the range Zx of a actual depth value is about a value of Zw/2, so that it may be reduced to about the half of the originally intended range. In this case, it is possible to compensate for the changed 3D effect through either the convergence control or the depth map scaling explained in FIGS. 10 to 12.

As can be seen from FIG. 13, the viewing geometry parameter information is a factor capable of immediately affecting the 3D effect, such that it is possible to compensate for the 3D effect by adjusting a viewing distance according to the viewing environment of a user. In accordance with one embodiment of the present invention, the viewing distance is adjusted along with the convergence control process or the depth map scaling process, such that it is possible to compensate for the 3D effect according to the display device of the receiving unit and the viewing environment of a user.

The above-mentioned methods for compensating for the 3D effect may be independently or collectively used in consideration of various factors, for example, transmitted content, transmission environments, performance of a broadcast receiver, a viewing environment of a user, and the like.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler. The above-stated hardware devices may be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

Mode for the Invention

Various embodiments have been described in the best mode for carrying out the invention.

INDUSTRIAL APPLICABILITY

As apparent from the above description, embodiments of the present invention may be wholly or partially applied to a digital broadcasting system.

According to embodiments of the present invention, the broadcast receiver can control a display device to output a 3D effect intended by a manufacturer of 3D video data on the basis of information of a viewing condition of the received 3D video data.

In addition, according to embodiments of the present invention, the broadcast receiver controls an output of a display on the basis of information of a viewing condition of 3D video data, such that it can allow display devices having different conditions to display 3D video data in response to a condition intended by a 3D-image manufacturer.

In addition, according to embodiments of the present invention, the broadcast receiver controls an output of a display on the basis of information of a viewing condition of 3D video data, such that it can provide a user with effective and convenient broadcast environments.

The invention claimed is:

1. A three dimensional (3D) video data processing method for use in a broadcast receiver, the method comprising:
    receiving a broadcast signal including three dimensional (3D) video data, a display condition descriptor, a viewing distance table including a plurality of viewing distance information, and a screen size table including a plurality of screen size information;
    storing the viewing distance table and the screen size table;
    extracting the display condition descriptor of the 3D video data from the broadcast signal,
    wherein the display condition descriptor includes:
    viewing distance mapping table information linking the display condition descriptor to the viewing distance table,
    first parameter information indicating a first index number applied to the viewing distance table,
    screen size mapping table information linking the display condition descriptor to the screen size table; and
    second parameter information indicating a second index number applied to the screen size table,
    wherein the viewing distance table includes first index number information having same value of the first index number, and viewing distance information specifying a value of an intended viewing distance corresponding to the first index number information, and
    wherein the screen size table includes second index number information having same value of the second index number, and screen size information specifying a value of an intended screen size corresponding to the second index number information, and
    controlling an output of the 3D video data using the viewing distance information and screen size information.

2. The 3D video data processing method according to claim 1, wherein the display condition descriptor includes viewing distance information of the received 3D video data, and at least one of screen size information and pixel interval information.

3. The 3D video data processing method according to claim 1, wherein the extracting of the display condition descriptor of the 3D video data from the broadcast signal includes:
    decoding supplemental header information from a video elementary stream (ES) contained in the received 3D video data; and
    obtaining the display condition descriptor from the decoded supplemental header information.

4. The 3D video data processing method according to claim 1, wherein the extracting of the display condition descriptor of the 3D video data from the broadcast signal includes:
    extracting a Program Map Table (PMT) or a Terrestrial Virtual Channel Table (TVCT) from the broadcast signal; and
    obtaining the display condition descriptor from the Program Map Table (PMT) or the Terrestrial Virtual Channel Table (TVCT).

5. The 3D video data processing method according to claim 1, wherein the 3D video data includes left view video data and right view video data.

6. The 3D video data processing method according to claim 5, wherein the controlling of the output of the 3D video data using the viewing distance information and screen size information includes:
    horizontally shifting at least one of the left view video data and the right view video data;
    and outputting at least one of the shifted left view video data and the shifted right view video data.

7. The 3D video data processing method according to claim 5, wherein the controlling of the output of the 3D video data using the viewing distance information and screen size includes:
  scaling depth values contained in a depth map related to the 3D video data;
  and outputting the scaled 3D video data result.

8. The 3D video data processing method according to claim 5, wherein
  the controlling of the output of the 3D video data using the viewing distance information and screen size information includes:
  adjusting a viewing distance of the 3D video data, and
  outputting the adjusted 3D video data result.

9. A broadcast receiver comprising:
  a receiving unit for receiving a broadcast signal including three dimensional (3D) video data, a display condition descriptor, a viewing distance table including a plurality of viewing distance information, and a screen size table including a plurality of screen size information;
  a storage for storing the viewing distance table and the screen size table;
  an information extractor for extracting the display condition descriptor of the 3D video data from the broadcast signal,
  wherein the display condition descriptor includes:
  viewing distance mapping table information linking the display condition descriptor to the viewing distance table,
  first parameter information indicating a first index number applied to the viewing distance table,
  screen size mapping table information linking the display condition descriptor to the screen size table; and
  second parameter information indicating a second index number applied to the screen size table,
  wherein the viewing distance table includes first index number information having same value of the first index number, and viewing distance information specifying a value of an intended viewing distance corresponding to the first index number information, and
  wherein the screen size table includes second index number information having same value of the second index number, and screen size information specifying a value of an intended screen size corresponding to the second index number information, and
  a three dimensional (3D) video processor for controlling an output of the 3D video data using the viewing distance information and screen size information.

10. The broadcast receiver according to claim 9, wherein the display condition descriptor includes viewing distance information of the received 3D video data, and at least one of screen size information and pixel interval information.

11. The broadcast receiver according to claim 9, wherein the information extractor includes:
  a video decoder for decoding supplemental header information from a video elementary stream (ES) contained in the received 3D video data, and obtaining the display condition descriptor from the decoded supplemental header information.

12. The broadcast receiver according to claim 9, wherein the information extractor includes:
  a Program and System Information Protocol (PSIP) processor for extracting a Program Map Table (PMT) or a Terrestrial Virtual Channel Table (TVCT) from the broadcast signal, and obtaining the display condition descriptor from the Program Map Table (PMT) or the Terrestrial Virtual Channel Table (TVCT).

13. The broadcast receiver according to claim 9, wherein the 3D video data includes left view video data and right view video data.

14. The broadcast receiver according to claim 13, wherein the 3D video processor horizontally shifts at least one of the left view video data and
  the right view video data, and outputs at least one of the shifted left view video data and the shifted right view video data.

15. The broadcast receiver according to claim 13, wherein the 3D video processor scales depth values contained in a depth map related to the 3D video data, and outputs the scaled 3D video data result.

16. The broadcast receiver according to claim 13, wherein the 3D video processor adjusts a viewing distance of the 3D video data, and outputs the adjusted 3D video data result.

17. The 3D video data processing method according to claim 1,
  wherein the viewing distance table or the screen size table is structured into a form of a table including:
  table data type information indicating which one of the viewing distance information and the screen size information are contained in the table, and
  number information indicating a number of the first index number information or the second index number information included in the table.

18. The 3D video data processing method according to claim 9,
  wherein the viewing distance table or the screen size table is structured into a form of a table including:
  table data type information indicating which one of the viewing distance information and the screen size information are contained in the table, and
  number information indicating a number of the first index number information or the second index number information included in the table.

* * * * *